Figure 1:
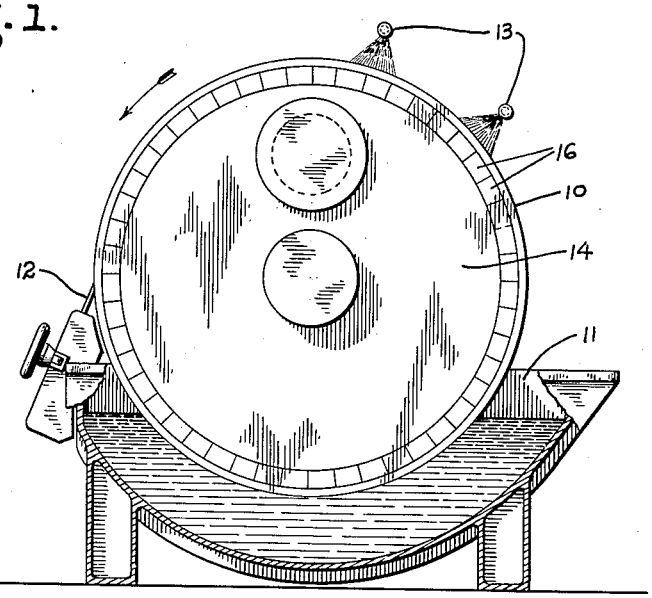

May 3, 1932. J. J. ARMSTRONG 1,856,452
CONTINUOUS FILTER
Filed April 28, 1930 2 Sheets-Sheet 1

INVENTOR.
John J. Armstrong.
BY *Wm. H. Atkinson*
ATTORNEY

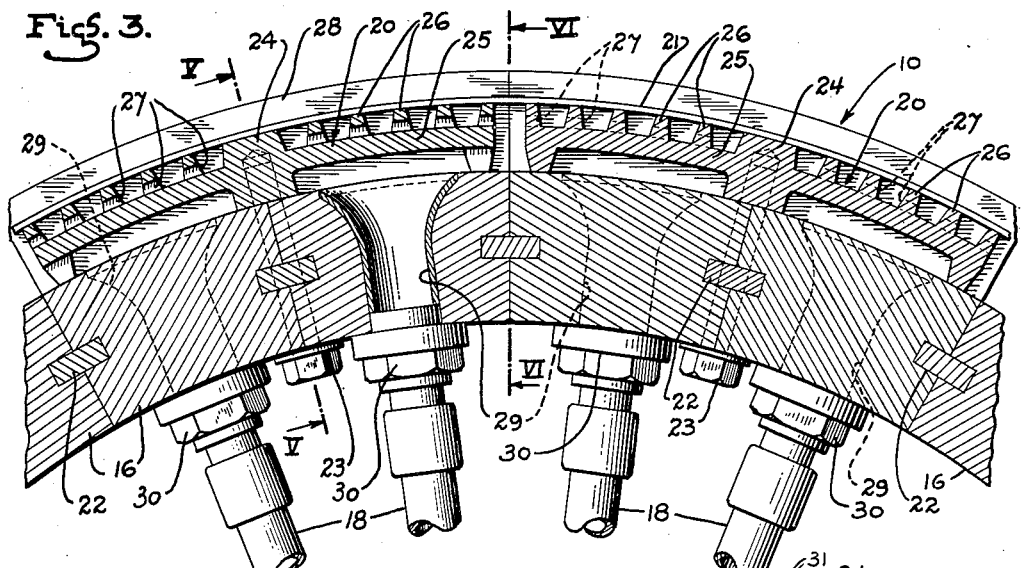
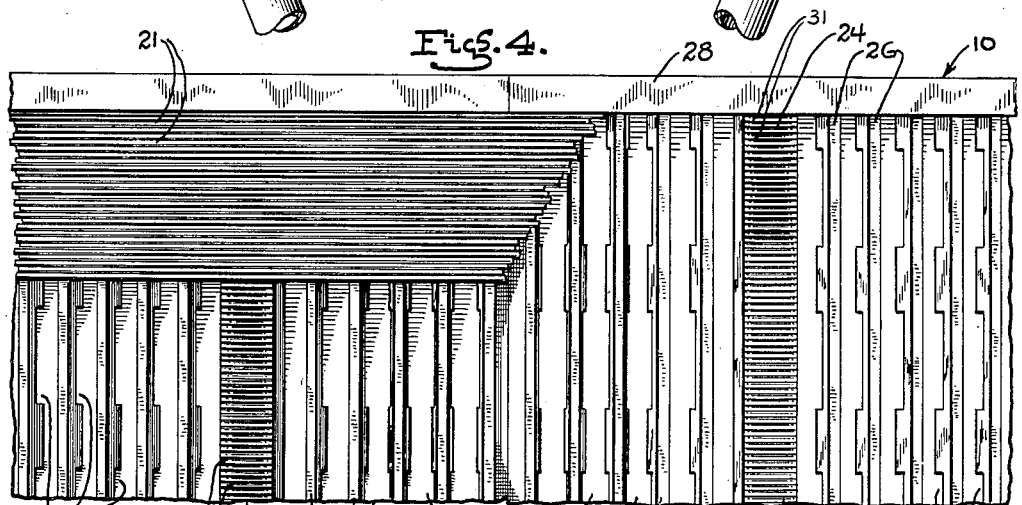
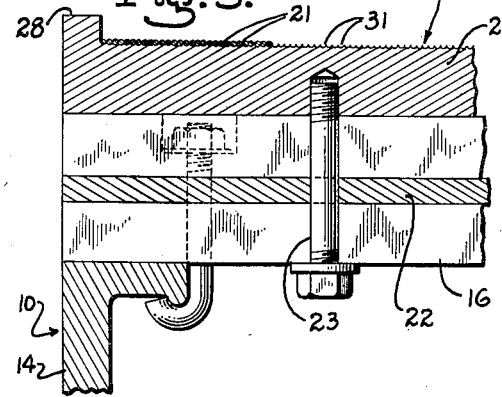
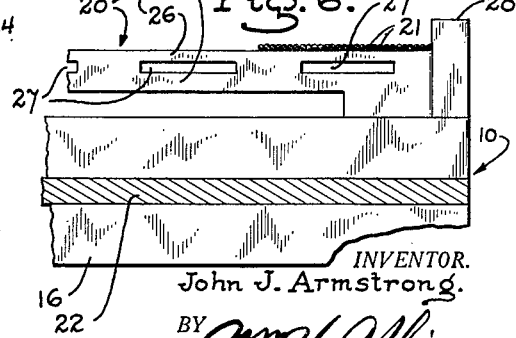
INVENTOR.
John J. Armstrong.

Patented May 3, 1932

1,856,452

UNITED STATES PATENT OFFICE

JOHN J. ARMSTRONG, OF CROCKETT, CALIFORNIA

CONTINUOUS FILTER

Application filed April 28, 1930. Serial No. 447,916.

My present invention relates to filters and more particularly to those of the continuous type, commonly known in the art as the Oliver type filters.

One object of my invention is to provide a new and novel form of apparatus of the above character which is simple, effective and superior in construction to any similar apparatus now in use.

Another object of my invention is to provide a new and novel filter of the above type in which a wire wound helically over the drum forms the filter surface.

A further object of my invention is to provide a new and novel improvement in rotary filters of the continuous type in which the filter dividing and supporting elements may be formed in a single structure.

Another object of my invention is to provide a filter material supporting element for rotary filters having pressure and suction features which in addition to forming a support for the filter material also serves to protect it from a direct blast or suction at the points where the pressure and suction connections are made.

A further object of my invention is to provide an integral element for rotary filters of the continuous type of such construction that no parts other than the drum, the securing means, and the filter material will be required to form the filter sections.

Other objects and advantages of my invention will be in part evident and in part pointed out in the following description wherein I have outlined in full that form of apparatus which I have selected for illustration in the accompanying drawings which form a part of this specification.

Continuous rotary filters of the type contemplated by my invention consist of a drum or cylinder, revolving partially submerged in an open tank containing the material to be filtered. The surface of the drum is divided into shallow compartments by dividing strips extending there along in spaced relation about the drum and over which there is provided a screen or other suitable filtering medium and through which the material to be filtered is drawn by suction.

Each of the filter sections formed on the drum as above is connected by a pipe passing through a hollow trunnion to an automatic valve which controls both the application of vacuum for forming the washing cake and the admission of air for its discharge and for cleansing the filter medium.

A scraper fitted across the top of the tank in which the filter operates rests against the filter surface in such a manner that the cake formed thereupon during the suction operation may be entirely removed after being released by air pressure from behind.

These filters are often provided with other accessories such as a means for heating the pulp while in the filter tank or to prevent a loss of heat thereby due to radiation and agitators of suitable design for the material to be filtered are also often placed in the bottom of the tank to keep the heavier particles in suspension and to insure a uniform and homogeneous mixture during the filtering operation.

Filters of this character at the present time are extremely complicated in construction. Briefly they are assembled by first dividing the drum into sections with dividing strips which are dovetailed or otherwise secured in spaced relation along the surface of the drum. Between these divided strips there is next placed suitable sections of filtering material. Beneath these sections of filtering material there is provided additional strips as means for supporting the same. This construction also necessitates the forming of end flanges upon the drum. Finally an additional layer of filtering material is wrapped about the filter sections formed as above, and a metallic screen or other protecting covering is then wound over the surfaces of the filter sections and dividing strips.

With this construction it will be appreciated that the problem of repairing such a filter or even a section thereof will be difficult and expensive.

In carrying out my invention I propose to use a single filtering element in the form of a helically wound wire mounted upon an improved form of support which also serves to divide the filter into sections, from the end flanges of the filter surface and protect the filter from damage from localized suction and pressure.

For a better understanding of my invention reference should be had to the accompanying drawings wherein I have shown by way of illustration and not of limitation one embodiment of my invention.

In these drawings—

Figure 2:
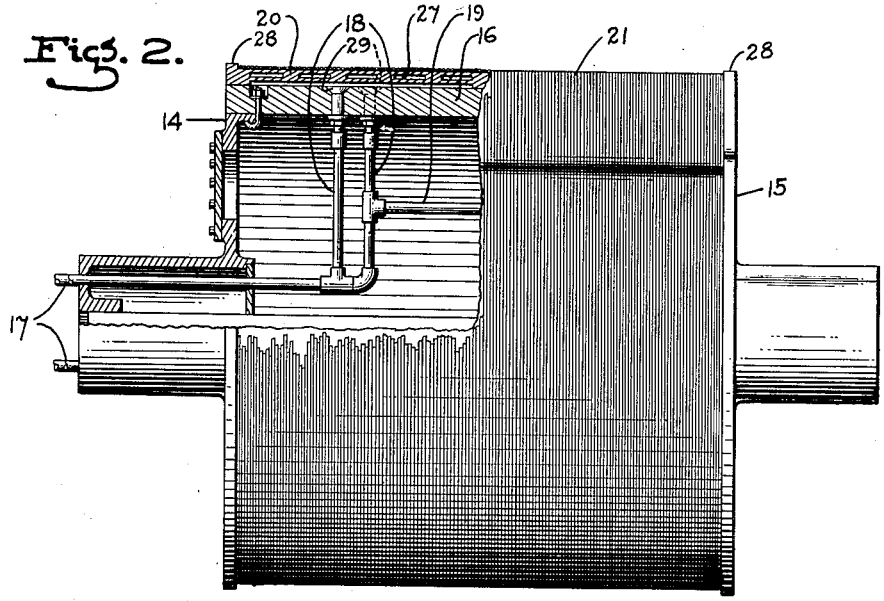

Figure 1 is an end elevation partially in section showing a filter drum of the type contemplated by my invention, Figure 2 is a side elevation partially in section showing the drum illustrated in Figure 1, Figure 3 is a fragmentary sectional end elevation showing the details of my invention, Figure 4 is a fragmentary plan view of the portion shown in Figure 3, Figure 5 is a partial sectional view taken along line V—V of Figure 4 looking in direction of arrows, and Figure 6 is a view similar to Figure 5 taken along line VI—VI of Figure 4.

In the drawings, 10 designates a revolving drum or cylinder upon which filtering sections, to be hereinafter described are formed. The drum is adapted to be placed horizontally with its lower portion extending into a tank 11 containing the mixture to be filtered. The tank 11 carries a suitable scraper 12 for removing the cake from the drum 10 after the filtering operation. Suitable liquid discharge conduits 13 through which a washing liquid or water may be projected upon the filter cake are also provided above the drum as shown.

As shown in Figure 2, the drum 10 is formed upon a pair of oppositely disposed trunnions 14 and 15 by securing thereto wooden staves 16 which form an impervious cylindrical surface. The trunnion 14 is designed to cooperate with a suitable automatic valve (not shown) and carries a plurality of concentrically arranged pipes 17 from which there extends radial pipes 18 which connect with the several filtering sections formed upon the drum 10. In this figure of the drawings the radial pipes 18 are duplicated for each section of the filter by the provision of an additional pipe 19 to insure a more uniform application of suction and pressure to the fiter surface.

It is to be understood that the structure so far described is standard practice and it is at this point that my construction departs from the prior art.

Having provided apparatus as above outlined I next secure upon the outer surface of the staves 16 a plurality of equally spaced dividing members 20 which in addition to dividing the drum surface into a plurality of filter sections also serve to support, in a novel way, an improved filter surface formed by closely winding a continuous wire 21 thereabout.

For a more detailed description of these latter aspects of my invention reference should be had to Sheet No. 2 of the drawings where I have illustrated these features in greater detail.

In Figure 3, the staves 16 are shown as grooved to receive a suitable sealing tongue 22 where at every second joint suitable bolts 23 pass through to secure the members 20 in place.

The members 20 are here shown as having a central dividing bridge or filter dividing portion 24 arranged centrally thereof and from each side of these dividing portions 24 there extends circumferentially disposed webs 25.

These webs 25 extend from the central dividing portions 24 around the drum 10 in uniformly spaced relation with the outer surface thereof and carry a plurality of secondary bridges 26 which serve to hold the filter medium 21 cylindrical at the filter sections. In order to provide against the secondary bridges 26 interfering with the free flow of the filtrate they are provided with a plurality of spaced passage ways 27 through which the filtrate as it is filtered will find a free path to the suction outlet of the filter. In addition to the above features the members 20 are also provided with end flanges 28 which serve to seal the ends of the filter sections and hold the filter medium 21 in place.

Disposed below the webs 25 and extending through the staves 16 of the drum there is provided suitable flared nozzles or nipples 29 which connect through couplings 30 with the previously referred to radially extending suction and pressure pipes 18. The nipples 29 are preferably arranged as illustrated in Figure 3 of the drawings or in other words immediately beneath the circumferentially disposed webs 25.

With the above arrangement it will be readily seen that when suction or pressure is exerted upon the filter surface through these nipples, the suction or pressure will be uniformly distributed over the surface of the respective filter section. In this connection I also desire to particularly point out another feature which these webs 25 possess, and that is the feature of deflecting any blast of liquid or air and preventing it from impinging upon a small surface of the filter as when freeing the cake or back washing.

By referring to Figures 4 and 5, it will be seen that the central dividing bridge portions 24 of the members 20 are turned out or notched as at 31, so as to provide a section sealing seat for the different turns of wire of the filter element 21.

In the embodiment of my invention illustrated I have shown the secondary bridges 26 as smooth along their top surface as I believe this arrangement tends to produce a more uniform filtering surface across the filter section, however, I desire to have it understood that I may in some instances prefer to notch these secondary bridges in the same manner as illustrated upon the central dividing bridge portions 24.

Figure 6 shows the arrangement and spacing of the passage ways 27 formed in the secondary bridges 26 and also illustrates the spacing of the webs 25 and the configuration of the end flanges 28.

The operation of my improved filter is as follows:

The material to be filtered in this type of filter is fed into the open filter tank 11 in a steady stream and a homogeneous mixture is maintained therein by agitation either mechanically or by use of compressed air. As the drum revolves, the filtering surface of the drum 10 passes through every part of the agitated mass and as each filter section under vacuum is immersed, a cake will begin to build up and will continue to build up until the filter section emerges from the material in the tank 11. During this time the filtrate passes through the filter medium and out through the vacuum pipes 18 while the solid particles or precipitate is retained on the wire filtering medium 21. After the filtrate is thoroughly drained from the precipitate or cake the wash water from the conduits 13 may be applied. This wash water is generally applied while the vacuum is maintained on the section being washed. As the drum 10 continues to rotate and a given filter section passes out of the washing zone, the vacuum is cut off by the automatic valve cooperating with the pipes 17 and compressed air is automatically turned on to thereby loosen or dislodge the cake, which is now removed from the drum by the stationary scraper 12. After passing the scraper 12 the filter sections present a clean filter surface which passes forward to immersion in the filtrate and the commencement of a new filtering cycle.

With a filter constructed as above it will be readily appreciated that the filtering surface may be completely removed and renewed by simply unwrapping the wire wound thereupon and rewrapping the drum with a new wire. It will also be seen, because of the novel design of my section forming and supporting elements, that the various filter sections are formed upon the drum in a simple and efficient manner with a minimum number of parts. In assembling the filter section forming members 20 upon the staves 16 I have found that a very good joint may be formed between the parts by coating the same with a thin layer of red or white lead so that when they are drawn tightly together a tight joint will result.

While I have, for the sake of clearness and in order to disclose my invention so that the same can be readily understood, described and illustrated specific devices and arrangements, I desire to have it understood that this invention is not limited to the specific means disclosed but may be embodied in other ways that will suggest themselves, in view of this broad disclosure, to persons skilled in the art. It is believed that this invention is broadly new and it is desired to claim it as such so that all such changes as come within the scope of the appended claims are to be considered as part of this invention.

Having thus described my invention, what I claim and desire to secure by Letters Patent is:

1. A continuous filter of the rotary type comprising, a cylindrical drum, a plurality of arcuate filter supporting elements arranged axially in spaced relation around said drum and forming filter sections thereupon, said filter supporting element being formed as a single unit with a central and axially extending bridge which forms a partition in the filter surface and holds the arcuate filter supporting portions in spaced relation with the cylindrical drum, a pressure and suction connection for each of the filter sections formed by said filter supporting elements, and a continuous wire wound about said supports forming a substantially cylindrical filtering surface.

2. A continuous filter of the rotary type comprising, a cylindrical drum, a plurality of arcuately shaped filter supporting elements arranged axially in spaced relation around said drum having a central axially extending bridge which engages the surface of the drum and divides it to form a plurality of filter sections, a pressure and suction connection for each of the filter sections, said connections being located adjacent said central bridge and beneath the arcuate filter supporting elements, and a continuous wire wound about said supports forming a substantially cylindrical filtering surface.

3. In a continuous filter of the rotating drum type, the combination of a rotatable drum, a plurality of filter supporting members extending axially along and arranged in spaced relation around said drum, each of said supporting members having an axially extending central portion for dividing the filter into separate filtering sections and circumferentially extending web portions which form supports for holding the filter element cylindrical adjacent said filtering sections, a continuous wire wound about said supports forming a filtering surface, and pressure and suction connection for each of said separate filtering sections directly beneath said web portions.

4. In a continuous filter of the rotating drum type, the combination of a rotatable drum, a plurality of unitary filter supporting members extending axially along and arranged in spaced apart relation around said drum, said filter supporting members having a central dividing bridge forming separate filtering sections and circumferentially extending web portions having secondary bridges for holding the filtering sections cylindrical upon the drum, pressure and suction connections between said dividing bridges and in communication below said circumferentially extending web portions with the separate filter sections formed thereby, and a filter element upon said bridges formed by winding a continuous length of impervious material thereupon.

5. In a filter of the continuous rotary type, the combination of a cylindrical drum, and a member having a central bridge portion disposed axially along the outer surface of said cylindrical drum for holding a filter element in spaced relation therewith, said member having integrally formed secondary bridges arranged parallel on each side of said central bridge and supported thereby in spaced relation with the drum for maintaining the filter element cylindrical.

6. In a filter of the continuous rotary type, the combination of a cylindrical drum, and a filter element supporting member having a central bridge portion disposed axially upon said cylindrical drum for dividing it into separate filter sections, said supporting member having oppositely disposed arcuate webs on each side of said central bridge upon which secondary bridges are provided for maintaining the filter element cylindrical and in uniformly spaced relation with said drum over the filter sections.

7. In a continuous filter of the rotary type, the combination of a rotatable cylindrical drum, a plurality of axially extending filter element supports secured in spaced relation around said drum, said filter element supports each having a single axially extending central bridge for dividing a filter element into sections and a plurality of secondary bridges formed integral therewith and supported thereby for maintaining the filter element concentric with said drum between said central bridges, and a filter element wound upon said bridges forming a filtering surface between said central bridges.

8. In a filter of the continuous rotary type, the combination of a cylindrical drum, a unitary one piece structure having a central bridge disposed axially upon the surface of said drum and dividing it into separate filter sections, said bridge having integrally formed oppositely disposed portions extending from each side thereof in spaced relation with the drum upon which there is formed secondary bridges for holding a wound filter element in concentric relation with the drum.

9. In a filter of the continuous rotary type, the combination of a cylindrical drum, alternately arranged and radially spaced suction and pressure pipes extending through said drum, a filter section forming partition secured upon the outer surface of said drum between alternate pairs of suction and pressure pipes, said section forming partition having baffle forming webs which extend from each side thereof concentric with said drum and over said suction and pressure pipes, whereby a localized zone of suction or pressure upon the filter surface will be prevented.

10. The combination with a filter drum of the character described, of a continuous closely wound wire forming a filter medium surrounding the drum, and a plurality of supports interposed between the drum and the filter medium, said supports comprising a plurality of arc-shaped members which are secured in concentric relation with the drum and have a plurality of integrally formed axially extending bridges upon the outer surface thereof for engaging the turns of the filter element and an inwardly projecting central bridge disposed axially along the drum for securing the support in spaced relation with the surface of the drum and dividing the latter to provide a plurality of filter sections.

JOHN J. ARMSTRONG.